(12) United States Patent
Benson

(10) Patent No.: US 11,796,426 B2
(45) Date of Patent: Oct. 24, 2023

(54) AIR FLOW MEASUREMENT AND TESTING FOR AIR CONDITIONING SYSTEMS

(71) Applicant: Energy Quest Technologies Inc., Chandler, AZ (US)

(72) Inventor: Dwayne M. Benson, Chandler, AZ (US)

(73) Assignee: Energy Quest Technologies Inc., Chandler, AZ (US)

( * ) Notice: Subject to any disclaimer, the term of this patent is extended or adjusted under 35 U.S.C. 154(b) by 48 days.

(21) Appl. No.: 17/389,944

(22) Filed: Jul. 30, 2021

(65) Prior Publication Data

US 2022/0128436 A1    Apr. 28, 2022

Related U.S. Application Data

(60) Provisional application No. 63/104,936, filed on Oct. 23, 2020.

(51) Int. Cl.
*G01M 99/00* (2011.01)
*G01K 13/024* (2021.01)
*G01P 5/165* (2006.01)

(52) U.S. Cl.
CPC ......... *G01M 99/008* (2013.01); *G01K 13/024* (2021.01); *G01P 5/165* (2013.01); *G01K 2201/00* (2013.01)

(58) Field of Classification Search
CPC .............. G01M 99/008; G01K 13/024; G01K 2201/00; G01P 5/165
See application file for complete search history.

(56) References Cited

U.S. PATENT DOCUMENTS

| | | | | |
|---|---|---|---|---|
| 2007/0235587 | A1* | 10/2007 | Delort | B64F 1/364 244/114 R |
| 2014/0102125 | A1* | 4/2014 | Tinde | B64F 1/362 62/237 |
| 2018/0372771 | A1* | 12/2018 | Moss | G01P 5/165 |

FOREIGN PATENT DOCUMENTS

CN    111751075 A  * 10/2020   ............... B64F 5/60

* cited by examiner

*Primary Examiner* — Herbert K Roberts
*Assistant Examiner* — Anthony W Megna Fuentes
(74) *Attorney, Agent, or Firm* — Brian M. Kaufman; Robert D. Atkins; PATENT LAW GROUP: Atkins and Associates, P.C.

(57) ABSTRACT

An HVAC system is monitored or tested using a tube with a measurement instrument in the tube. The tube is connected to an HVAC system and an output of the HVAC system is measured using the measurement instrument. The tube is connected between the HVAC system and a volume to be conditioned. A reading of the measurement instrument is noted while the tube is connected between the HVAC system and volume. The volume is disconnected from the tube and a valve is connected to the tube. The valve is adjusted until the reading of the measurement instrument is approximately the same with the valve as when the volume was connected. A setting of the valve is noted and then used to test the HVAC system in the future or to test other HVAC systems simulating the same load.

13 Claims, 12 Drawing Sheets

AIR FLOW MEASUREMENT AND TESTING FOR AIR CONDITIONING SYSTEMS

CLAIM OF DOMESTIC PRIORITY

The present application claims the benefit of U.S. Provisional Application No. 63/104,936, filed Oct. 23, 2020, which application is incorporated herein by reference.

FIELD OF THE INVENTION

The present invention relates in general to heating, ventilation, and air conditioning (HVAC) systems, and, more particularly, to an air flow measurement system and method usable with HVAC systems.

BACKGROUND OF THE INVENTION

HVAC systems are commonly used in a wide variety of settings. Two important aspects of HVAC systems are the ability to move air through a system and the ability to output air at a desired temperature. Regular testing and maintenance are important for continued operation within desired parameters. An HVAC system can begin failing without the user realizing anything is wrong. A failing HVAC system can operate at a very low efficiency, fail to reach the desired temperature, or fail to produce the necessary pressure.

Some HVAC use-cases include multiple HVAC units at a single site. Consistently testing and maintaining many HVAC systems can present a serious challenge. Moreover, the HVAC systems may be used to cool a vehicle that is only temporarily connected. For instance, airports will commonly have an HVAC system at each terminal gate to air condition an airplane parked at the gate. Testing the HVAC systems unloaded, i.e., without an airplane connected, is less likely to reveal problems because the HVAC system may not be sufficiently taxed to reveal signs of failure.

Testing typically needs to be done with a load connected to the HVAC system to be effective. However, loading down an HVAC system for testing is inconvenient and presents many logistical and scheduling challenges when the HVAC system isn't permanently connected to a load. Therefore, a need exists for an improved device and method for testing HVAC systems.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
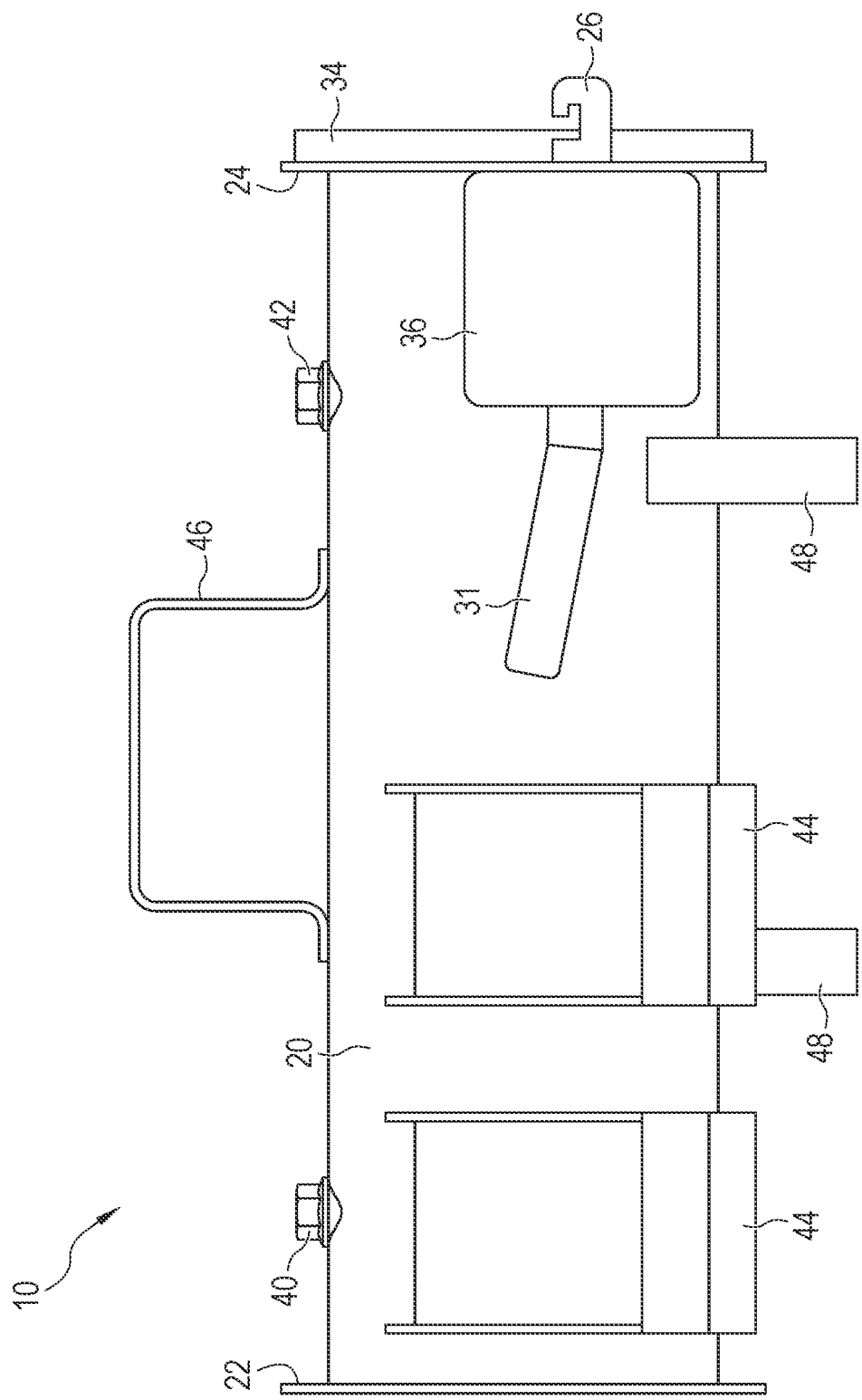
FIGS. 1a-1c illustrate a flow measurement tube.
Figure 1B:
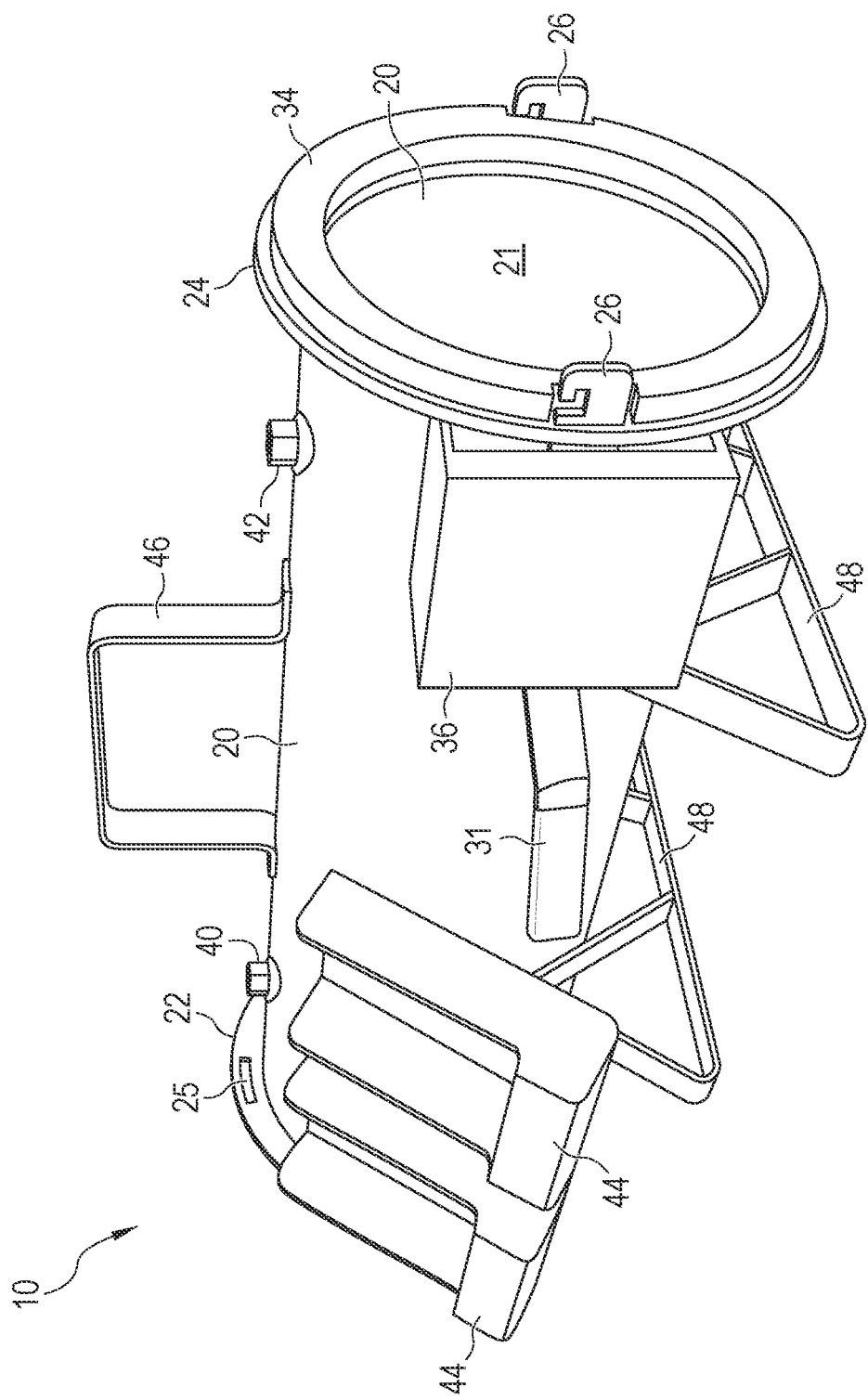
Figure 1C:
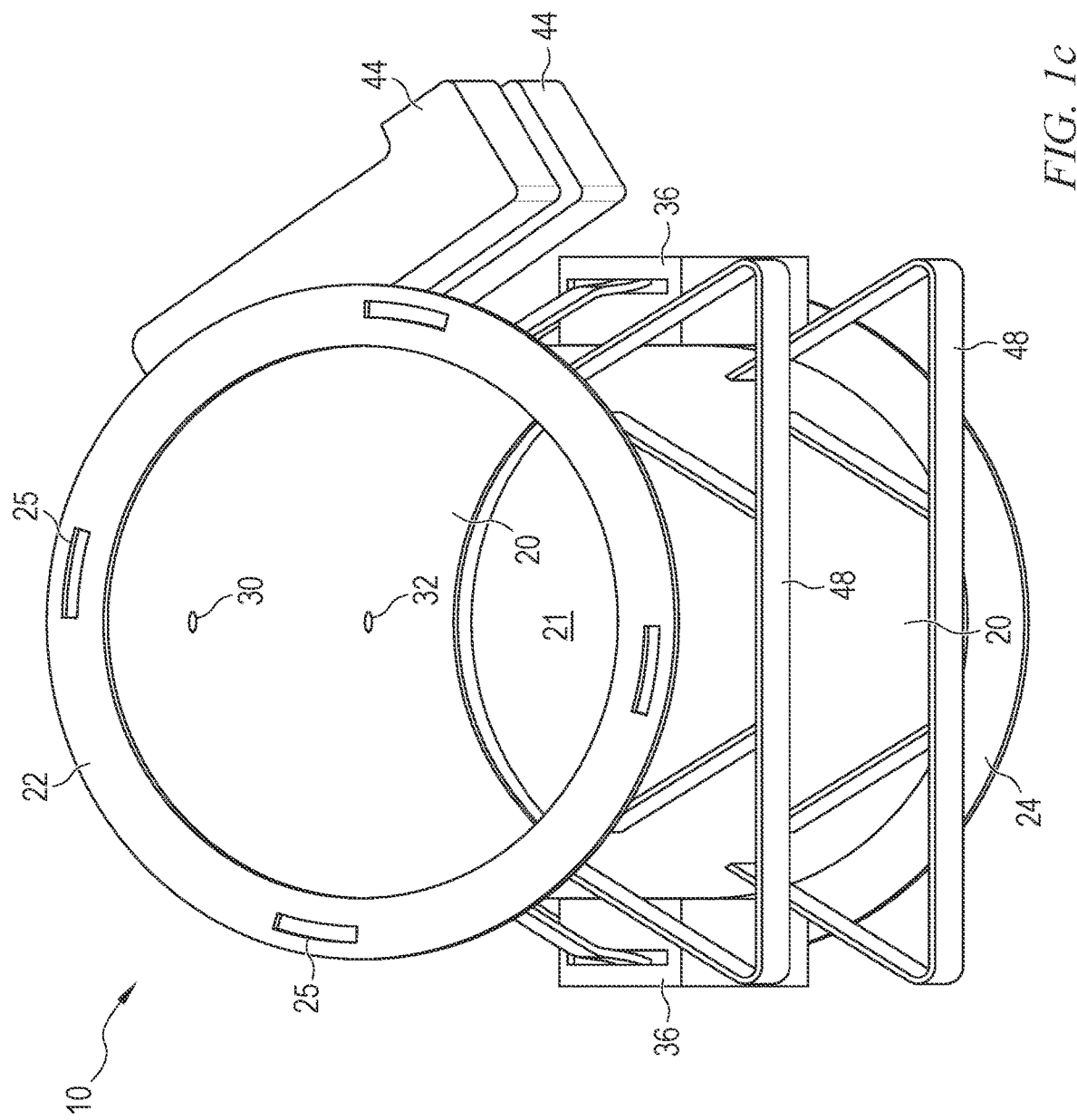

FIGS. 1a-1c illustrate a flow measurement tube 10 that can be connected to an HVAC system to measure air flow, pressure, and temperature of the HVAC system's output. FIG. 1a is a side view, FIG. 1b is a perspective view, and FIG. 1c is a lengthwise view down tube body 20.

Tube body 20 is a circular aluminum tube used as the base to form flow measurement tube. Tube body 20 is formed by extruding aluminum in a circular shape to leave an air flow channel 21 in the middle of the tube. The extruded tube is cut to the desired length and then flanges 22 and 24 are formed on the ends of the tube. Tube body 20 is formed of steel, plastic, or any other suitable material in other embodiments. Tube body 20 can be formed by other methods, such as molding. The tubular shape can be circular, square, polygonal, irregular, or any other desired shape.

Tube body 20 has an inlet flange 22 and an outlet flange 24. Flanges 22 and 24 can be separately formed from sheet metal and welded to tube body 20. Flanges 22 and 24 can also be molded into the desired shape along with tube body 20 or formed using any other suitable method. Flanges 22 and 24 are flat circular extensions outward from the ends of base tube 20 that are used to attach ducts or hoses to flow measurement tube 10. Flanges 22 and 24 can also be used to attach flow measurement tube 10 directly to an HVAC system or airplane without an intervening duct.

Inlet flange 22 includes four slots 25 distributed around the flange for an attachment mechanism to grip flange 22. Outlet flange 24 has hooks 26 that correspond to slots 25. Slots 25 and hooks 26 are common types of fasteners that are used to mechanically connect HVAC ducts. Flange 22 is considered a female duct connector and flange 24 is considered a male duct connector. Flow measurement tube 10 can be attached in-line with existing HVAC ducts using the corresponding fasteners in the HVAC ducts. The location where two HVAC ducts attach will have one male end with a flange having hooks similar to hooks 26 attached to a female end with a flange having slots similar to slots 25.

When the duct ends are separated, hooks of one duct are inserted into slots 25 of flange 22 and then tightened down. Hooks 26 of flange 24 are inserted through slots of the other duct's flange. Handle 31 swings up or down to tighten hooks 26 so that the hooks pull the duct's flange against flange 24. A gasket 34 made of a compressible material, e.g., plastic or rubber, helps make a more airtight seal between flange 24 and the flange of the duct being attached. Flange 22 could also have a gasket, but the prevailing standard indicates gaskets on flanges of male connectors so the duct being attached should have a gasket.

Cover 36 hides the mechanism connecting handle 31 to hook 26 to reduce the likelihood of a user's hand being pinched and injured. Other types of mechanisms can be used to operate hooks 26, such as knobs that are turned. Hooks can extend around the outsides of the connected flanges to pull the flanges together rather than through slots in the flanges. While two hooks 26 are shown, some embodiments use three or four hooks corresponding to the additional slots 25.

Two openings or holes 30 and 32 are formed through tube body 20. Holes 30 and 32 allow measurement instruments to be inserted into tube body 20 while flow measurement tube 10 is otherwise sealed in-line between an HVAC system and a volume being conditioned. With two ducts coupled to flanges 22 and 24, flow measurement tube 10 is fully sealed other than holes 30 and 32. Holes 30 and 32 can be formed through tube body 20 by drilling or by any other suitable means. Holes 30 and 32 can be any suitable size and shape to accommodate the desired measurement instruments being used. In one embodiment, holes 30 and 32 are circular with ⅜-inch diameters.

Two bosses 40 and 42 are disposed over holes 30 and 32, respectively. Bosses 40 and 42 are welded onto tube body 20 over holes 30 and 32, molded together with the tube body and flanges 22 and 24, or otherwise attached. Bosses 40 and 42 have threaded openings through the bosses that align with openings 30 and 32. Bosses 40 and 42 in combination with openings 30 and 32 provide ports from outside of flow measurement tube 10 to inside for insertion of measurement instruments. In other embodiments, compression fittings or other types of ports are used. Compression fittings can be screwed into bosses 40 and 42 to provide easy installation and removal of sensors.

Bosses 40 and 42 provide internal threading for openings 30 and 32. Instruments being inserted through openings 30 and 32 can have corresponding external threading that interfaces with bosses 40 and 42 to keep the instruments within the openings. Screwing down instruments within openings 30 and 32 fully seals flow measurement tube 10 when ducts are attached to both flanges 22 and 24. Instruments with plastic threads may be sufficient to create a seal with bosses 40 and 42. Instruments with metal threads may benefit from thread seal tape made of, e.g., polytetrafluoroethylene (PTFE), to improve the seal and get more accurate readings. When compression fittings are used, the fittings squeeze down on a smooth cylindrical surface of the instruments to provide a seal.

Two trays or pockets 44 are attached to the side of flow measurement tube 10. Pockets 44 are used to hold the measurement units of the instruments being used to measure air flow, temperature, etc. The measurement units are set in pockets 44 and have wires that extend from the measurement units to probes extending into flow measurement tube 10 through bosses 40-42 and openings 30-32 to take measurements of air flow through the HVAC ductwork. Having instruments stored in pockets 44 allows the instruments and flow measurement tube 10 to be picked up and transported by hand easily using handle 46.

Feet 48 extend below tube body 20 to provide a stable base to support flow measurement tube 10. Feet 48 have flat bottoms that keep flow measurement tube 10 from rolling when set on a surface. Pockets 44, handle 46, and feet 48 can be aluminum or steel and welded onto tube body 20. Alternatively, pockets 44, handle 46, and feet 48 can be molded along with tube body 20 and flanges 22 and 24.

Figure 2A:
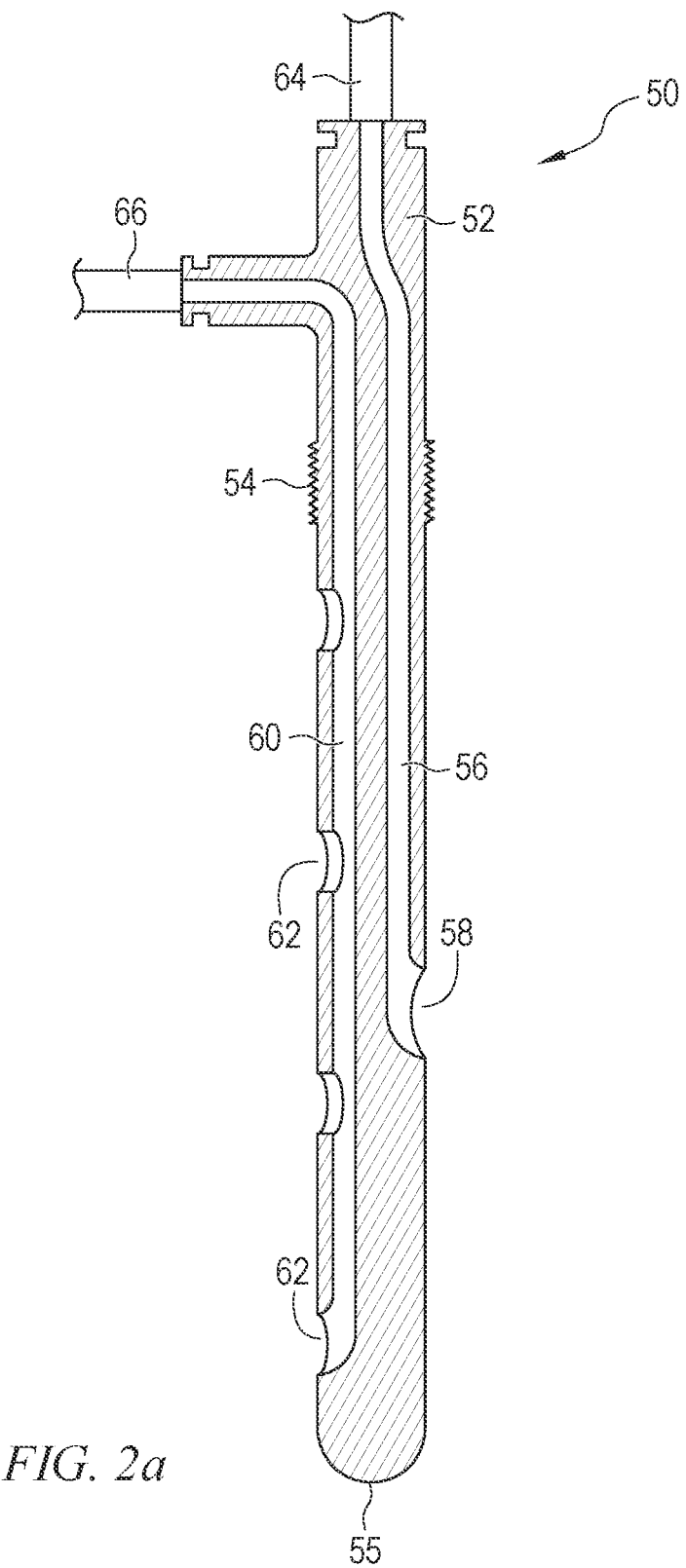
FIGS. 2a-2d illustrate measurement instruments used with the flow measurement tube.

FIGS. 2a-2d illustrate instruments used with flow measurement tube 10. FIG. 2a shows a pitot tube 50 that can be installed into boss 40 or 42 to allow air flow measurements of the air flow through flow measurement tube 10. In the below examples, hole 30 and boss 40 are used for pitot tube 50 but hole 32 and boss 42 or additional holes could be used as well.

Pitot tube 50 is a rake style pitot tube including a main body 52. External threads 54 are formed around body 52. Threads 54 correspond to the internal threads of bosses 40 and 42 to allow pitot tube 50 to be screwed down into the bosses. Tip 55 of pitot tube 50 is inserted through boss 40 and hole 30 until threads 54 meet the boss. With tip 55 within flow measurement tube 10, pitot tube 50 is turned to move threads 54 into the threads of boss 40. Pitot tube 50 is turned until an airtight seal is formed. PTFE tape can be used if needed to create an airtight seal. Alternatively, the smooth cylindrical surface of pitot tube 50 is inserted into a compression fitting that seals around the pitot tube.

Pitot tube 50 includes a static pressure conduit 56 connected to one or more inlets 58 and a dynamic pressure conduit 60 coupled to one or more inlets 62. A tube 64 is connected to static pressure conduit 56 at the top of pitot tube 50. A tube 66 is connected to dynamic pressure conduit 60 at a side arm of pitot tube 50. Tubes 64 and 66 communicate air pressure received at openings 58 and 62, respectively, to a measurement unit set in a pocket 44. The measurement unit observes the static pressure and dynamic pressure via pitot tube 50 and calculates a variety of information using the acquired sensor values, e.g., mass flow and differential pressure. Those skilled in the art will know how to calculate air mass flow rate based on static pressure, dynamic pressure, and temperature. Specific formulae for calculating mass flow rate are disclosed in the provisional patent application incorporated herein by reference. While one specific style of pitot tube 50 is shown, any suitable instrument for measuring static and dynamic air pressure can be used. Pitot tube 50 will get the most accurate readings by being placed in the most upstream port, e.g., boss 40 and opening 30, due to eliminating disturbance in the airstream from upstream instruments that could lead to an incorrect pressure reading.

Figure 2B:
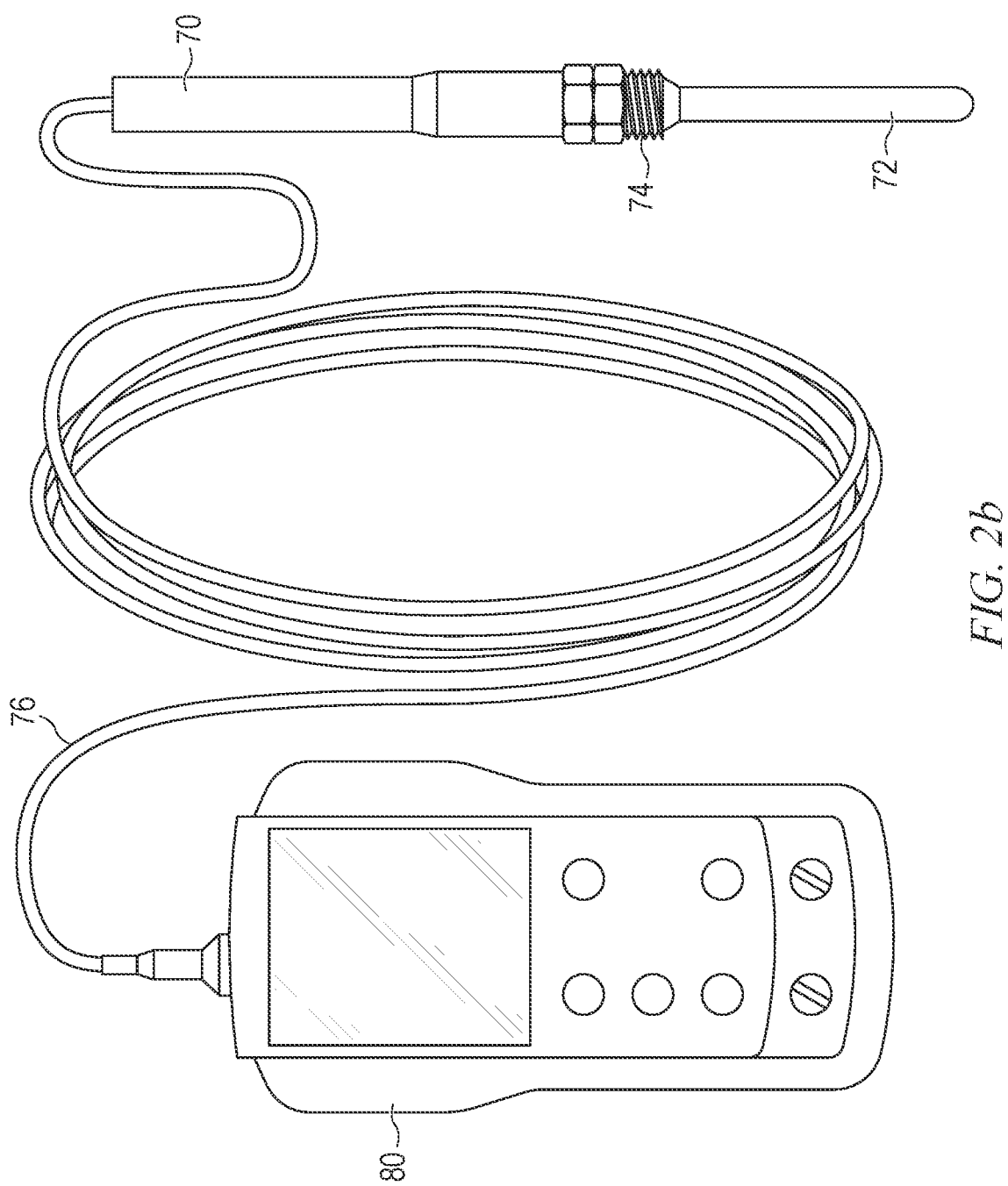

FIG. 2b shows a temperature sensor 70 that can be installed into boss 40 or 42 to allow air temperature within flow measurement tube 10 to be measured. In the below examples, hole 32 and boss 42 are used, but hole 30 and boss 40 or additional holes could be used as well.

Temperature sensor 70 includes a probe tip 72 that is inserted into boss 42 and hole 32 to place the probe tip within flow measurement tube 10. Temperature sensor 70 is screwed into boss 42 via threads 74 or inserted into a compression fitting. A cable or wire 76 connects temperature sensor 70 to a measurement unit 80. Measurement unit 80 sits in a pocket 44 and displays the measured temperature. In some embodiments, temperature sensor 70 is a thermocouple probe or thermistor.

Figure 2C:
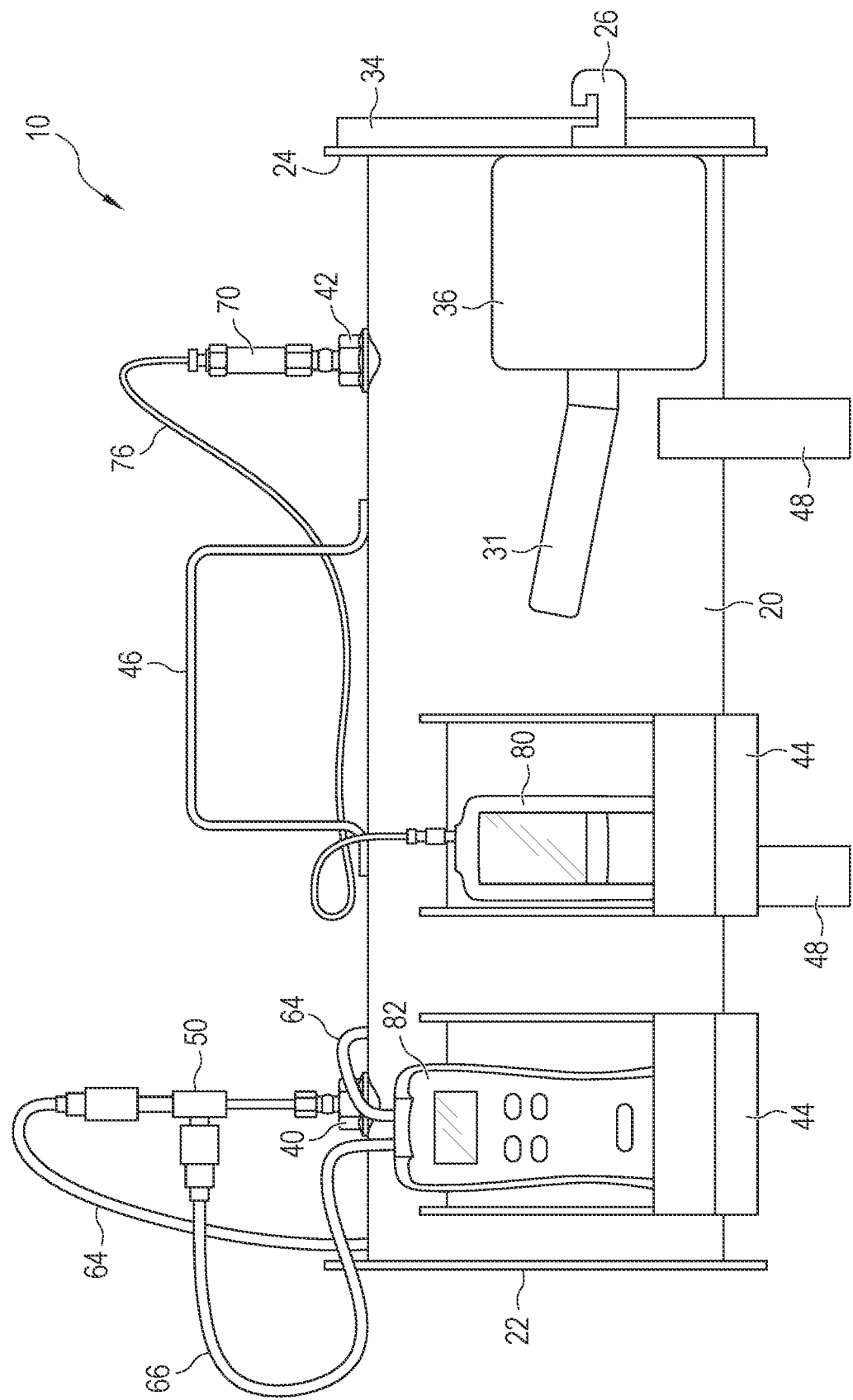

FIG. 2c shows pitot tube 50 and temperature sensor 70 installed into bosses 40 and 42. Pitot tube 50 is connected to measurement unit 82 via tubes 64 and 66. Measurement unit 82 senses the air pressure within both tubes and calculates static pressure, dynamic pressure, differential pressure, and any other desired values. In one embodiment, measurement unit 82 is a manometer. Temperature sensor 70 is connected to measurement unit 80 by cable 76. Measurement unit 80 calculates or detects air temperature using temperature sensor 70. Measurement units 80 and 82 are set within pockets 44.

Figure 2D:
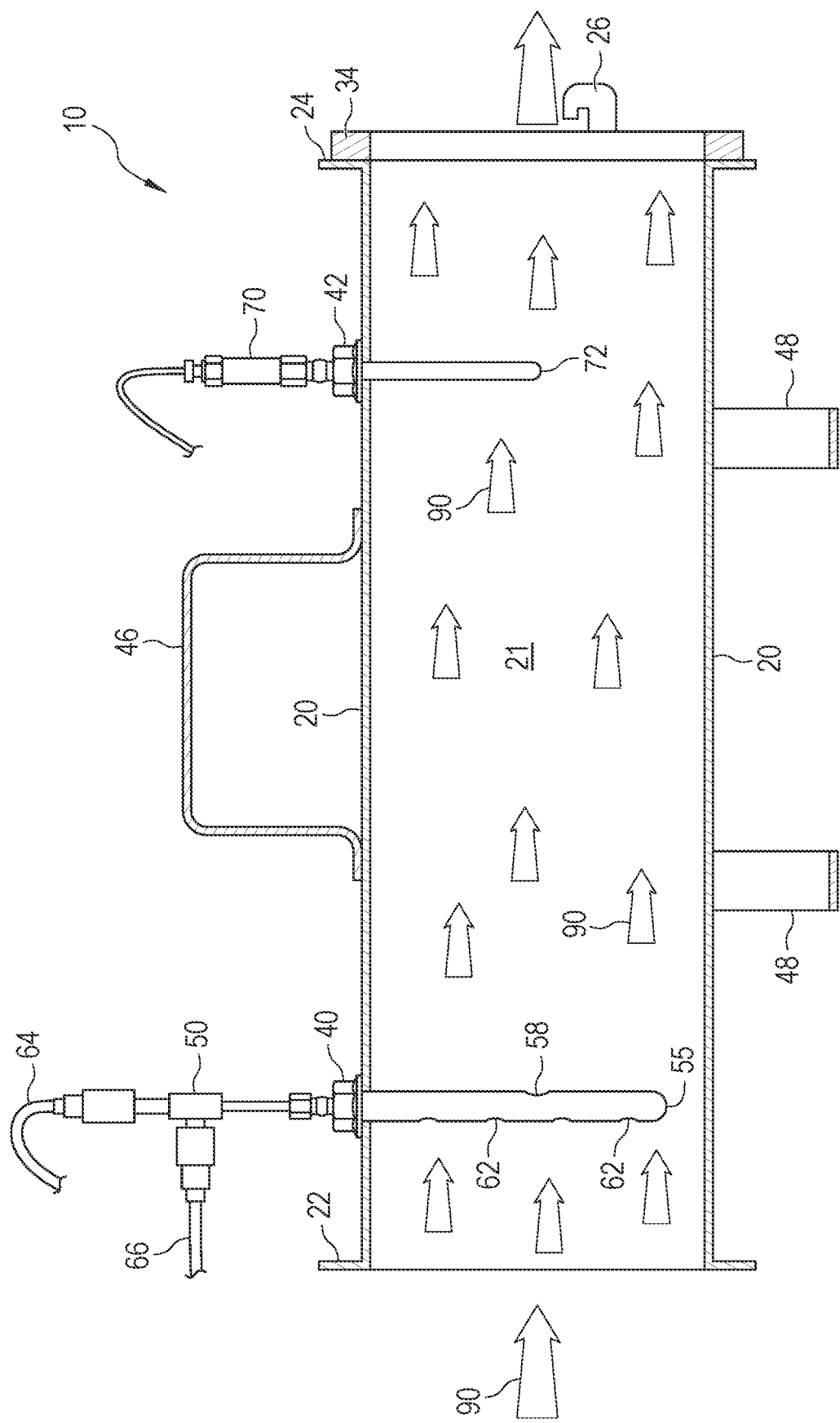

FIG. 2d shows a cross-sectional view of flow measurement tube 10 with temperature sensor 70 and pitot tube 50 installed. Air flow channel 21 within flow measurement tube 10 has air flowing from left to right as indicated by arrows 90. Air is pumped into flow measurement tube 10 from an HVAC system connected via a duct connected between the HVAC system and flange 22. Air leaves flow measurement tube 10 and flows to an airplane or other volume to condition via a duct attached to flange 24.

Inlets 62 of pitot tube 50 are oriented upwind so that the momentum of air flow into inlets 62 allows measurement of dynamic pressure. Inlet 58 is oriented downwind for static pressure measurement. Air flowing through channel 21 contacts probe 72 of temperature sensor 70 to allow measurement of air temperature. Flow measurement tube 10 with pitot tube 50 and temperature sensor 70 allows measurement of the air flow temperature and pressure being put out by an HVAC system.

Figure 3:
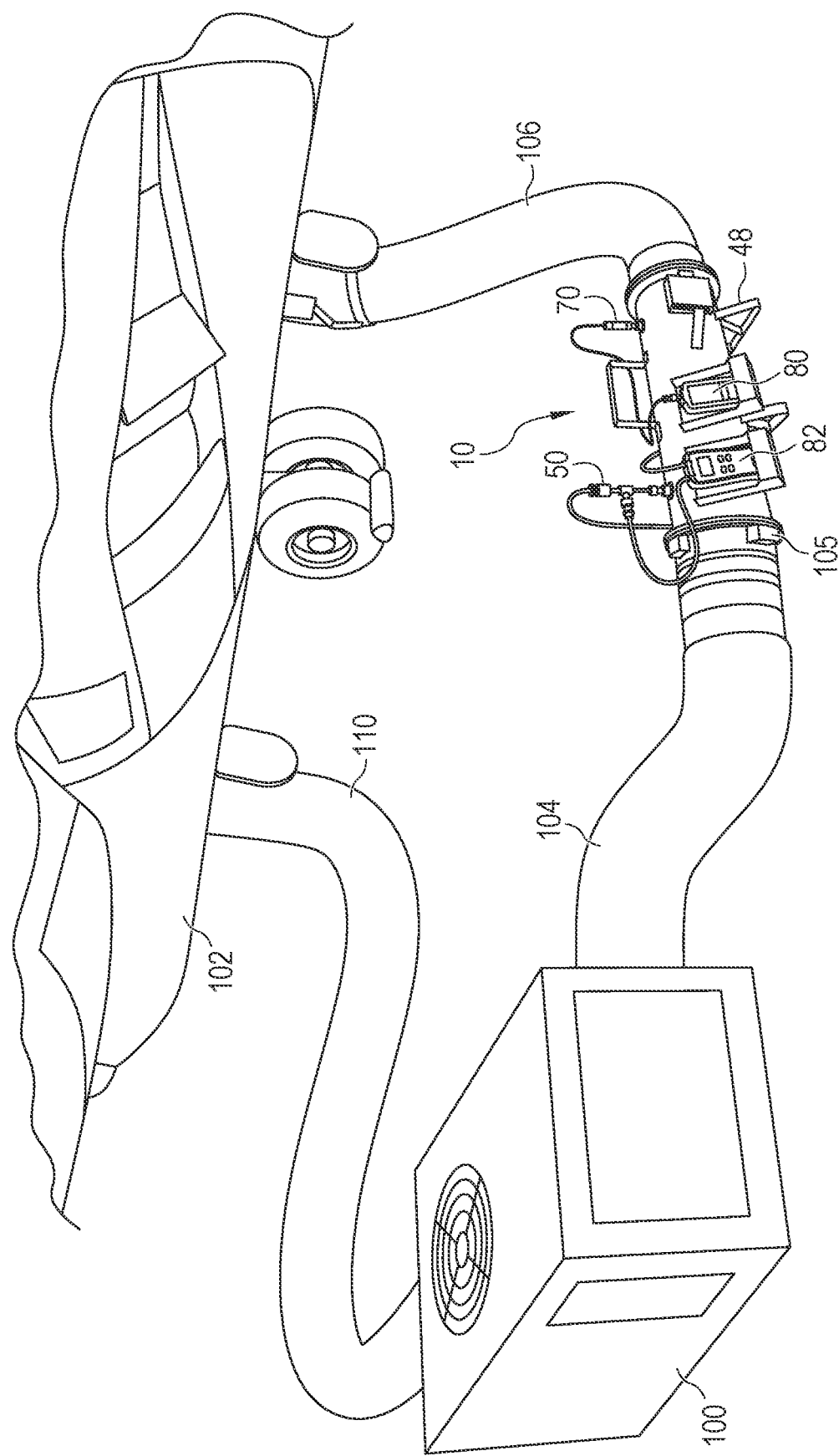
FIG. 3 illustrates the flow measurement tube hooked up in the air flow path from an HVAC system to an airplane.

FIG. 3 shows flow measurement tube 10 connected in series between an HVAC system 100 and an airplane 102. While an airplane is specially shown, the volume being conditioned could be a ground vehicle such as a bus, or a stationary building such as an office building or house. A duct 104 connects HVAC system 100 to flow measurement tube 10 and duct 106 connects the flow measurement tube to airplane 102. Duct 104 includes a male flange coupled to flange 22 of flow measurement tube 10. Duct 106 includes a female flange coupled to flange 24. Flow measurement tube 10 can also be coupled directly to airplane 102 or HVAC system 100 without an intervening duct. Straightening out ducts 104 and 106 near flow measurement tube 10 will produce more accurate results by reducing turbulence within the flow measurement tube.

HVAC system 100 includes a fan to blow air through duct 104 and a heat pump system to cool or warm the air. Other types of HVAC systems are compatible with flow measurement tube 10 as well, e.g., a furnace based system, an ozone injector, a humidifier, a blower fan without temperature control, etc. A return duct 110 is connected from airplane 102 to HVAC system 100 to allow air to cycle through HVAC system 100 rather than escaping to the environment. In some cases, return duct 110 is disconnected to clear air from airplane 110 out to the environment, e.g., to reduce the amount of contaminates within the airplane cabin.

Hooking up flow measurement tube 10 between HVAC system 100 and airplane 102 allows monitoring of the HVAC system output. Air pressure measured with pitot tube 50 is used to ensure that HVAC system 100 is generating the proper air flow. A failing HVAC system is commonly accompanied by a reduced output pressure. Monitoring with flow measurement tube 10 can provide early notice of a failing blower fan. Measuring temperature with temperature sensor 70 indicates whether the heat pump is operating properly or failing. If air through flow measurement tube 10 is not reaching the intended temperature, an impending failure of the heat pump may be indicated.

Other types of sensors can be added onto flow measurement tube 10 in addition to temperature and air pressure. Carbon dioxide, nitrogen dioxide, carbon monoxide, particular matter, humidity, and ozone are all examples of substances that can be detected. The sensors can be attached via bosses 40 and 42 or using other suitable means. Additional holes and bosses or other attachment means can be added in addition to bosses 40 and 42 to allow more than two sensors. The sensors can be used to monitor air conditions within airplane 102, and not just to detect failure of HVAC unit 100. For instance, humidity can be monitored to enable a mister in the air stream whenever humidity falls under a desired threshold. Similarly, an ozone detector can be used with flow measurement tube 10 to keep ozone at a desired level within airplane 102 to sanitize the cabin. The ozone detector can further monitor levels while the airplane is cleared of ozone to ensure sufficiently safe levels are reached.

The sensors can be wirelessly connected to a cell phone or computer application via Bluetooth, Wi-Fi, or another suitable technology, or a wired connection via Universal Serial Bus (USB), Ethernet, or similar format can be used. The app can collect air flow data while HVAC system 100 is running. Mass flow and other data is calculated by the app and can be viewed in real time in the app. Historical data can be graphed and browsed.

One issue with testing HVAC system 100 in the manner shown in FIG. 3 is that an airplane 102 may not always be conveniently available at the time testing is desired. Without airplane 102 connected, HVAC system 100 is essentially unloaded and is less likely to show signs of failure even if failure is imminent. HVAC system 100 should be loaded with an air flow resistance that approximates the attachment of airplane 102 for accurate testing.

Figure 4A:
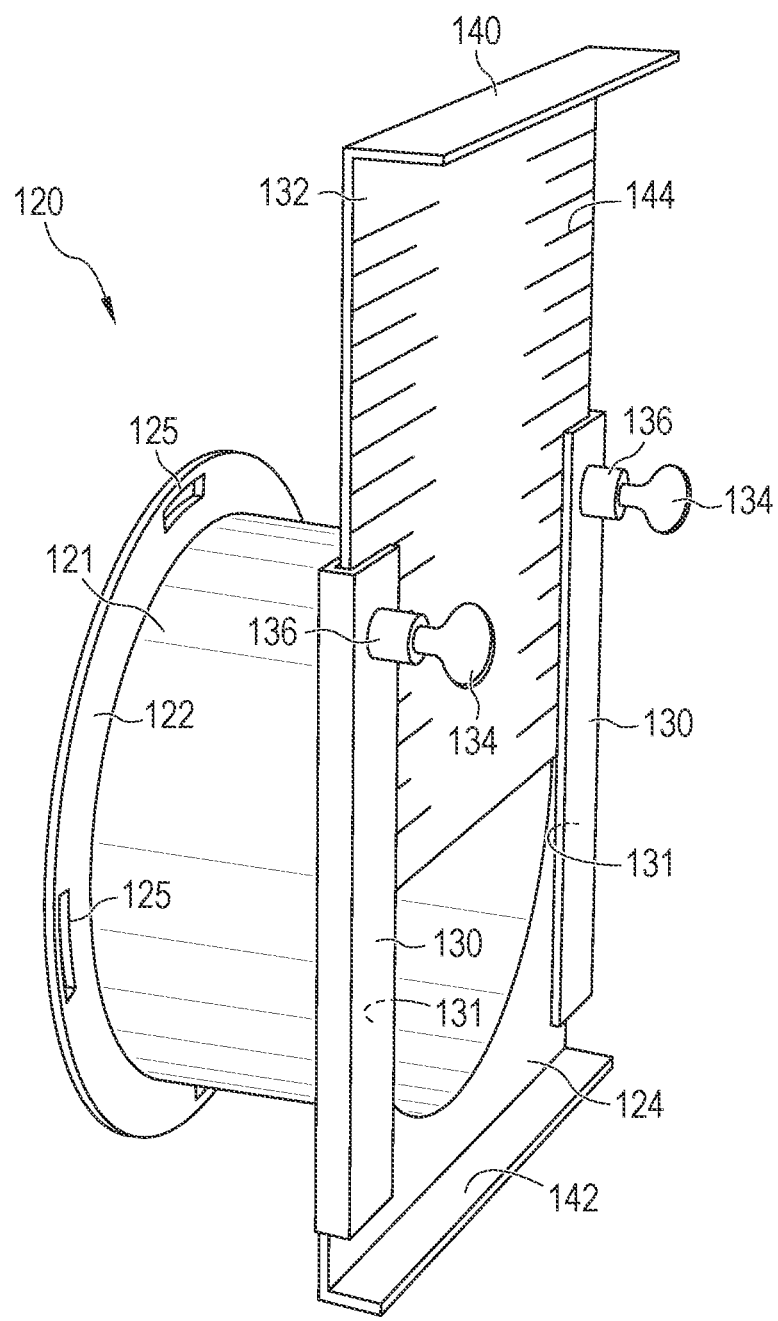
FIGS. 4a and 4b illustrate a slide valve usable with the flow measurement tube.
Figure 4B:
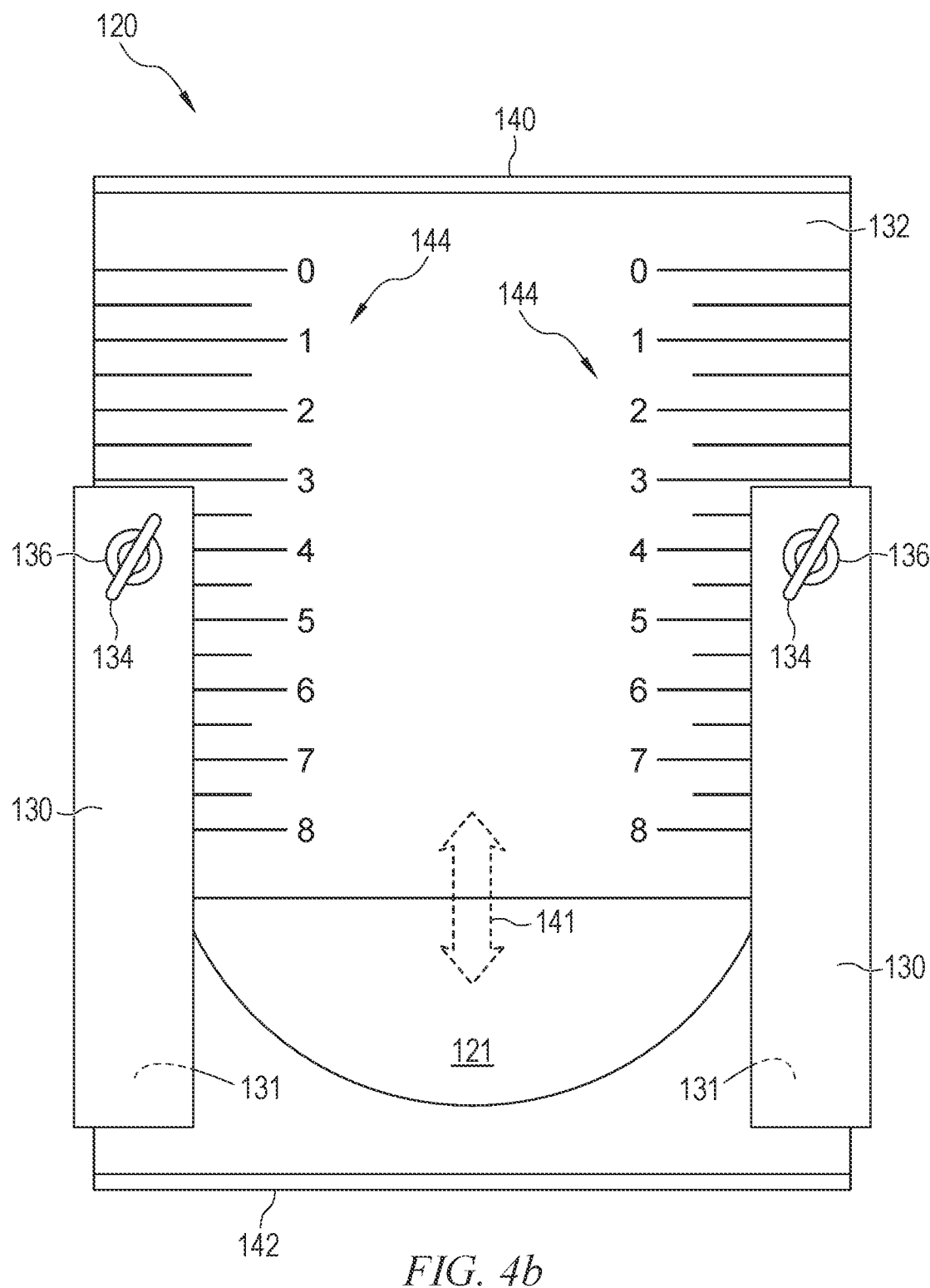

FIGS. 4a and 4b illustrate a slide valve 120 that can be attached to flange 24 of flow measurement tube 10. Slide valve 120 is formed with a similar material and manufacturing method as flow measurement tube 10 and includes a tube 121 and flange 122. Flange 122 is a female flange, similar to or the same as flange 22 of flow measurement tube 10 including having slots 125 for hooks 26 to interface with. Flange 122 allows slide valve 120 to be attached to male flange 24 of flow measurement tube 10. Hooks 26 are inserted into slots 125 and then handles 31 are actuated causing the hooks to pull flange 122 against flange 24. The pressure applied by hooks 26 compresses gasket 34 between the flanges to create a seal. Slide valve 120 can be removed by flipping handles 31 the other direction and thereby releasing hooks 26.

The end of tube 121 opposite flange 122 has a large flat surface 124 that extends outwardly like a flange. Surface 124 has two wings 130 folded at the sides into two tracks 131 that guillotine plate valve door 132 moves up and down in. The outside ends of tracks 131 are far enough apart that the width of valve door 132 fits within the two tracks. Wings 130 reach far enough inward so that valve door 132 is held in tracks 131 between wings 130 and surface 124. A width of tracks 131 between wings 130 and surface 124 is sufficient so that valve door 132 slides up and down relatively freely within the tracks.

Valve door 132 is slid up or down to the desired height and then thumb screws 134 are tightened into threaded bosses 136 to hold the valve door in place. Threaded bosses 136 are welded or formed over a hole completely through wings 130 so that the tips of thumb screws 134 press against valve door 132. Tightening thumb screws 134 causes valve door 132 to be pressed in between surface 124 and the tips of the thumb screws. Any type of bolt or screw can be used instead of thumb screws 134.

Valve door 132 is a thin piece of sheet metal cut into a rectangle of appropriate size to fit within tracks 131. A handle 140 is formed by folding the sheet metal of valve door 132 to a 90-degree angle. Handle 140 gives the user something to grip to adjust valve door 132 up and down as shown by arrow 141. Other types of handles can be made from or attached to the sheet metal of valve door 132. Surface 124 is folded at the bottom of slide valve 120 into a lip 142. Lip 142 stops valve door 140 after the valve door is fully closed.

Valve door 132 has gradations 144 etched, painted, or otherwise disposed on its front surface. Gradations 144 are used to accurately determine how far valve 120 is opened. The number that is even with the top of wings 130 corresponds to how far the bottom of valve door 132 is from the bottom of tube 121. In FIG. 4b, the number three is just above the top of wings 130 so the bottom of valve door 132 is slightly over three inches from the bottom of tube 121. The units for gradations 144 could alternatively be centimeters or any other desired unit. Gradations 144 are used when adjusting valve door 132 to set the orifice area between the bottom of the valve door and the bottom of tube 121 to a desired size. Thumb screws 134 are used to hold the valve door in place for use. Gradations 144 are formed on valve door 132 adjacent to both wings 130 so that the valve door can be made level.

Figure 5A:
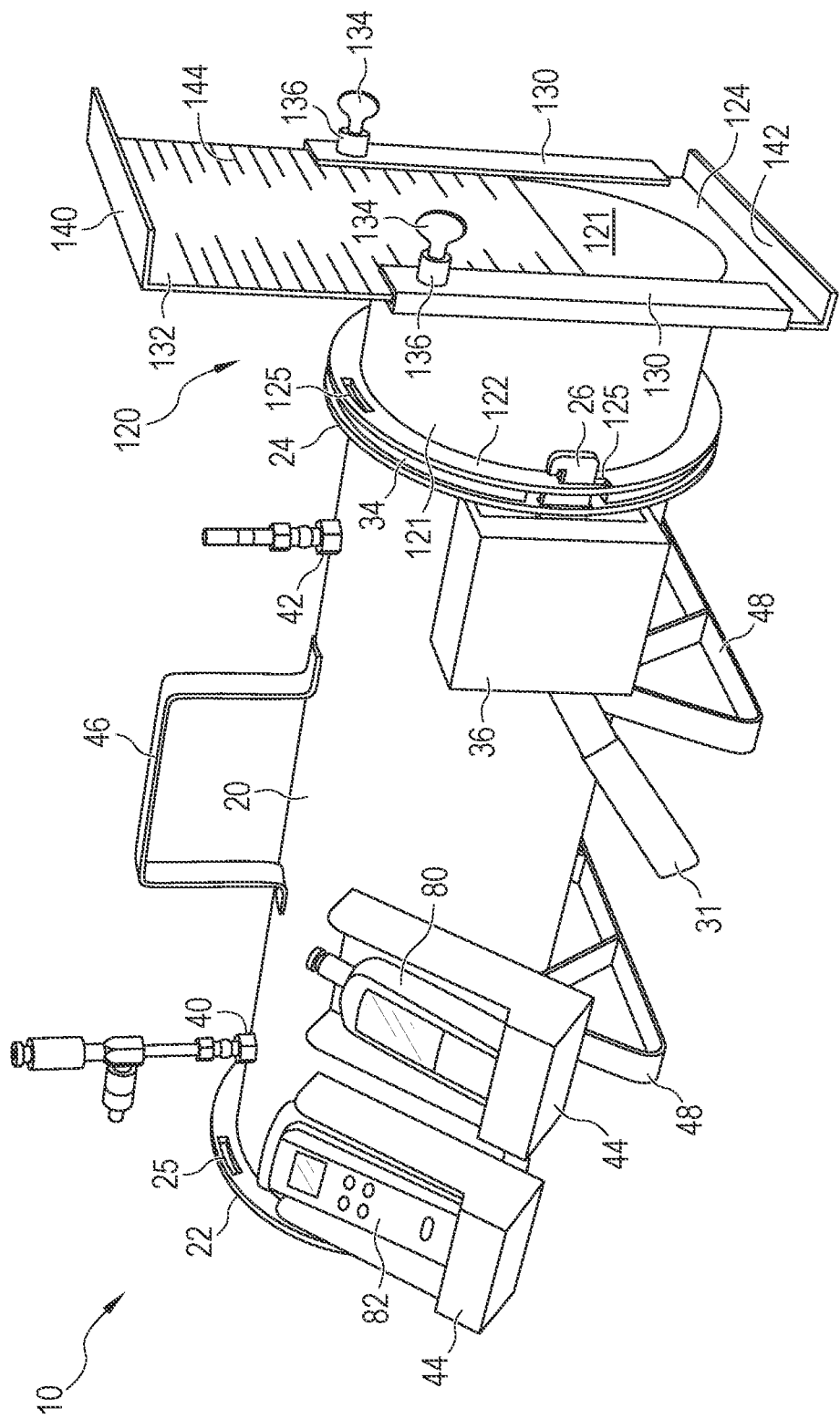
FIGS. 5a and 5b illustrate the flow measurement tube and slide valve hooked up to an HVAC system.
Figure 5B:
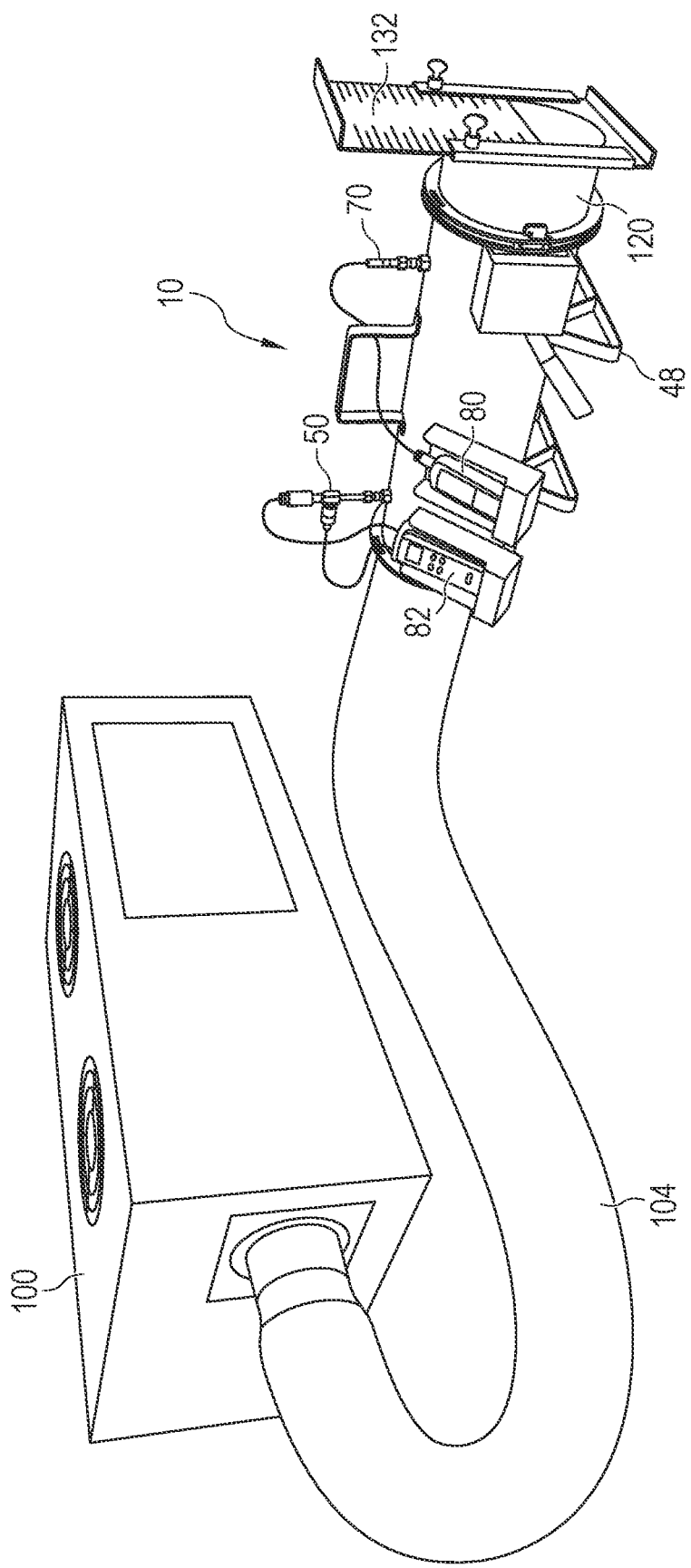

Slide valve 120 is attached to flow measurement tube 10 as shown in FIG. 5*a* to provide resistance to air flow through the flow measurement tube as a replacement for airplane 102 being connected. Moving valve door 132 further down, i.e., to a lower setting on gradations 144, creates more of a resistance to air flow by reducing the orifice area. Moving valve door 132 upward, i.e., to a higher setting on gradations 144, reduces resistance to air flow by increasing the orifice area. Flow measurement tube 10 can be attached to HVAC system 100 without airplane 102 being present or attached, as shown in FIG. 5*b*. The air flow resistance provided by slide valve 120 allows HVAC system 100 to be taxed at approximately the same level as if airplane 102 were present, thereby providing valid testing results.

In one embodiment, a duct is added between flow measurement tube 10 and slide valve 120, which can increase the accuracy of readings by moving the valve further away from the sensors. Whether connected to airplane 102 or slide valve 120, ensuring that ducts or hoses connected to flow measurement tube 10 are straight and aligned will provide more accurate measurements due to a more uniform air velocity through the flow measurement tube.

Prior to testing using slide valve 120, the desired gradation 144 setting should be determined. Determining the proper setting on gradations 144 starts with hooking up flow measurement tube 10 without slide valve 120 between HVAC system 100 and airplane 102 as shown in FIG. 3. Reference sensor readings are determined with an HVAC system 100 that is known to be working properly. The static pressure and dynamic pressure are measured using pitot tube 50 and measurement unit 82 and noted down for reference. Temperature is also measured using temperature sensor 70 and noted. Static pressure, dynamics pressure, and temperature can be used to calculate air mass flow for reference.

With the proper readings in hand for when airplane 102 is attached to a known good HVAC system, the airplane is disconnected and replaced by slide valve 120 as shown in FIG. 5*b*. Valve door 132 of slide valve 120 is adjusted up and/or down using trial-and-error until the static pressure, dynamic pressure, and temperature readings are the same or as close as possible to the readings when airplane 102 was attached. Alternatively, air mass flow can be compared until the same value is reached with slide valve 120 as when airplane 102 was attached. When the readings are close to the same with slide valve 120 as they were with airplane 102 connected, then valve door 132 is at the proper level for simulating the airplane being connected. The number setting from gradations 144 can be noted and used later any time simulation of airplane 102 is desired.

As an alternative to the trial-and-error method, a formula can be created to determine slide valve position as a function of effective cross-sectional area. The formula can then be used after measuring static pressure, dynamic pressure, and temperature with airplane 102 to calculate a suitable slide valve position to provide the same air flow resistance. The formula can be determined by collecting empirical data. First, sensors are measured at different slide valve settings to calculate mass flow (e.g. ambient pressure, static pressure, differential pressure, and temperature). Those skilled in the art can then calculate the effective flow area to create an empirical relationship between slide valve position and effective area, thus creating a way to relate the data taken at the flow measurement tube when attached to an airplane to a slide valve position that simulates the flow resistance of the aircraft.

The orifice formed by valve door 132 segmenting tube 121 does not have the same pressure drop characteristics as a circular hole of the same cross-sectional area, so a correction factor will need to be used in the resulting formula to compensate. The correction factor can be determined empirically by mapping differences between circular orifices and circle segment orifices of the same area. The formula with the correction factor can be used within a phone or computer application to automatically calculate and display a position that the slide valve should be set at to simulate the currently connected aircraft based on collected data.

Any time testing of HVAC unit 100 is desired with the same resistance that airplane 102 would apply, valve door 132 can be moved to the same setting for retesting. If the pressure and temperature measurements are no longer meeting the previous readings at the same valve door 132 setting, then a failing HVAC system 100 is indicated. Moreover, flow measurement tube 10 with the same number can be used on other HVAC units that are the same or even different from HVAC unit 100 to simulate airplane 102 being hooked up to those other HVAC units. Usually, an airport will have an air conditioning unit attached under the jetway of each gate. Flow measurement tube 10 can be carried around to every gate at an airport for testing each HVAC unit.

In some instances, an airline only has one model of airplane that the airline flies, so testing of the HVAC units with just the one setting for airplane 102 is sufficient. In other cases, where multiple types of aircraft need to be supported, different number settings for gradations 144 can be determined for several different types of airplanes. Each number setting for each airplane can be saved so that the load of any of the airplanes an airline flies can be simulated at any time. Pressure and temperature readings can be logged for each HVAC unit and valve setting over time so that any negative trend can be recognized and corrected.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of monitoring or testing an HVAC system, comprising:
    providing a tube;
    disposing a measurement instrument in the tube;
    connecting the tube to the HVAC system;
    connecting the tube to a volume to be conditioned by the HVAC system, wherein the tube is coupled in series between the HVAC system and the volume;
    noting a reading of the measurement instrument while the tube is connected to the HVAC system and volume;
    disconnecting the volume from the tube;
    connecting the tube to a valve;
    measuring an output of the HVAC system using the measurement instrument; and
    adjusting the valve until the reading of the measurement instrument is approximately the same with the valve connected as when the volume was connected.

2. The method of claim 1, further including:
    noting a setting of the valve; and
    resetting the valve to the same setting to test the HVAC system.

3. The method of claim 1, further including coupling a duct between the tube and the valve.

4. The method of claim 1, further including disposing a temperature sensor in the tube, wherein the measurement instrument is a pressure sensor.

5. A flow measurement device, comprising: a primary tube; a measurement instrument disposed in the primary tube; and a valve connected to the primary tube, wherein the valve includes a secondary tube with a sliding valve door disposed at an end of the secondary tube.

6. The flow measurement device of claim 5, wherein the sliding valve door includes a plurality of gradations disposed on the sliding valve door to configure a setting of the valve.

7. The flow measurement device of claim 5, wherein the measurement instrument is a pressure sensor.

8. The flow measurement device of claim 5, wherein the measurement instrument is a temperature sensor.

9. The flow measurement device of claim 5, further including a flange formed at an end of the primary tube.

10. A flow measurement device, comprising:
a tube;
a measurement instrument disposed in the tube; and
a valve connected to the tube, wherein the valve includes a sliding valve door comprising a plurality of gradations disposed on the sliding valve door to configure a setting of the valve.

11. The flow measurement device of claim 10, wherein the measurement instrument is a pressure sensor.

12. The flow measurement device of claim 10, wherein the measurement instrument is a temperature sensor.

13. The flow measurement device of claim 10, further including a flange formed at an end of the tube.

* * * * *